Figure 1:
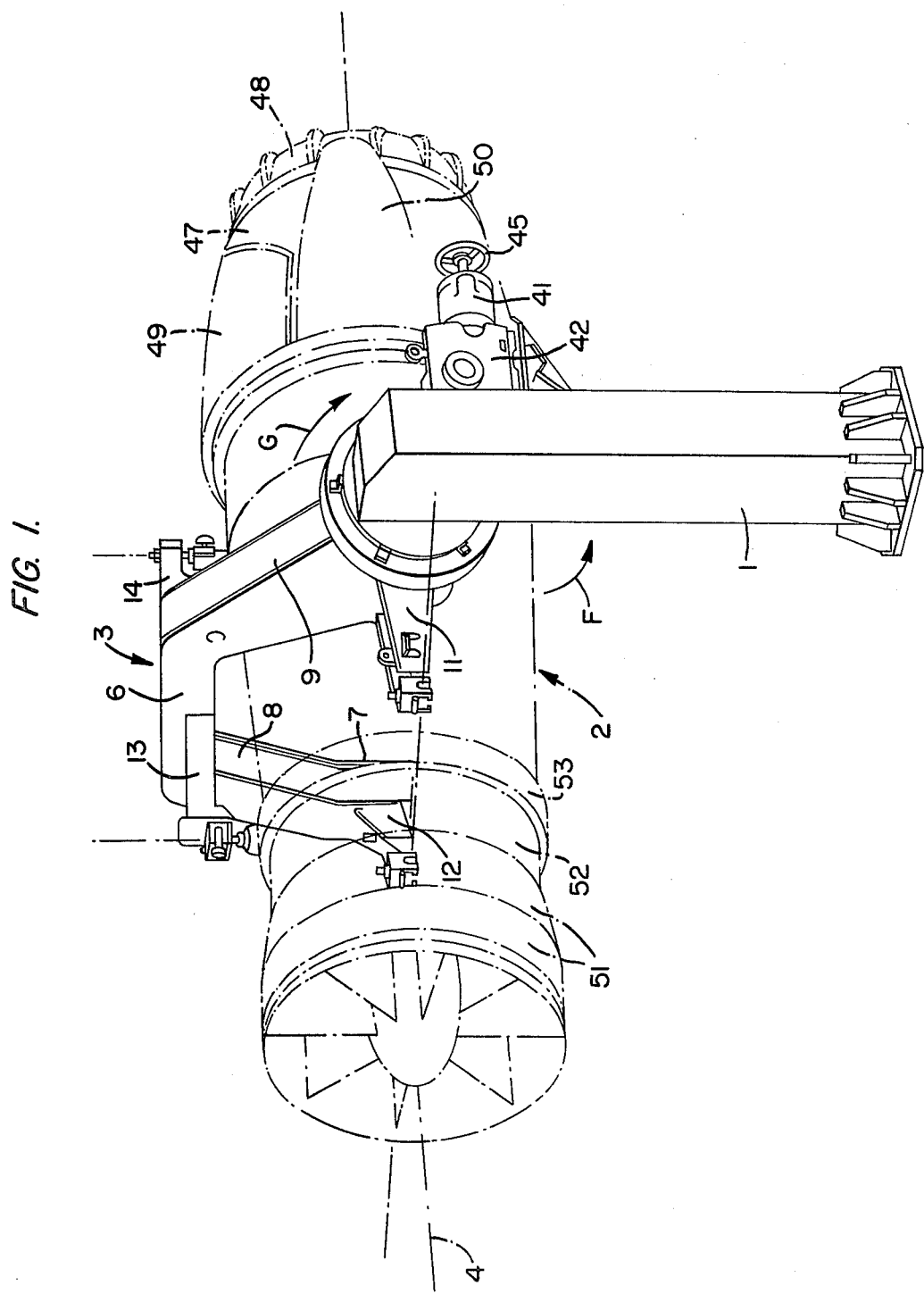

United States Patent [19]

Das Gupta et al.

[11] 4,200,273

[45] Apr. 29, 1980

[54] DEVICE FOR MAINTAINING GAS TURBINE ENGINES, MORE PARTICULARLY GAS TURBINE JET ENGINES

[75] Inventors: Arun-Kumar Das Gupta; Franz Seidl, both of Münich, Fed. Rep. of Germany

[73] Assignee: Motoren- und Turbinen-Union Munchen GmbH, Fed. Rep. of Germany

[21] Appl. No.: 902,849

[22] Filed: May 4, 1978

[30] Foreign Application Priority Data

May 4, 1977 [DE] Fed. Rep. of Germany ....... 2719850

[51] Int. Cl.² ............................................. B23Q 3/18
[52] U.S. Cl. ...................................... 269/61; 269/71; 269/296
[58] Field of Search ....................... 269/61, 71, 73, 17, 269/296

[56] References Cited

U.S. PATENT DOCUMENTS

| 1,468,397 | 9/1923 | Radke et al. | 269/61 |
| 1,600,835 | 9/1926 | Manley | 269/71 |
| 1,812,585 | 6/1931 | Collins | 269/61 |
| 2,703,252 | 3/1955 | Blackwell | 269/296 |
| 2,741,830 | 4/1956 | Lewis | 269/296 |
| 3,324,657 | 6/1967 | Hornschuch | |

FOREIGN PATENT DOCUMENTS 560669  9/1957  Belgium .

Primary Examiner—Robert C. Watson
Attorney, Agent, or Firm—Craig and Antonelli

[57] ABSTRACT

A support stand arrangement for gas turbine engines which includes a ground anchored base column on which is arranged a yoke for supporting the engine. The yoke is arranged at the base column for rotation together with a supported engine about an axis of rotation which extends at right angles to a centerline of the engine.

27 Claims, 6 Drawing Figures

DEVICE FOR MAINTAINING GAS TURBINE ENGINES, MORE PARTICULARLY GAS TURBINE JET ENGINES

The present invention relates to a support arrangement and, more particularly, to a support stand arrangement for gas turbine engines such as, for example, gas turbine jet engines by which the engines are supported so as to permit assembly, disassembly and maintenance of the components thereof.

For ease of manufacturing and/or reduction of production problems, modern gas turbine engines, particularly turbo-jet engines, are constructed from modular components so as to permit the successive step-by-step removal of complete, separable, serviceable parts such as, for example, the low-pressure, intermediate-pressure, and high-pressure compressors and their respective drive turbines.

To facilitate the manufacturing and/or maintenance of gas turbine engines, it has been proposed to vertically position the basic engine without the after-burner pipe and exhaust nozzle or to mount the engine in a position in which the maintenance and assembly of only certain components could be effected with an inversely relevant condition resulting if the assembly position were rotated through, for example, 180°.

Apart from the considerations described hereinabove, there are certain design aspects of gas turbine jet engines which compel the use of additional assembly stands for the engine in order to effect the assembly and/or removal of certain engine modules such as, for example, the compressor.

Considering the design aspects of the gas turbine engine and the proposed mounting of the engines for maintenance and/or assembly, the assembly and/or maintenance operations would, in this case, be interrupted continually by measures taken to shift the position of the engine which places the engine in additional jeopardy of damage when it is being lifted by a crane or similar device and/or when the engine is again being lowered to the floor.

Apart from the above considerations, considerable difficulties may be encountered when only attempting to anchor a partially assembled or disassembled engine securely to hoisting tackle of, for example, a portal jib crane or similar device to shift the positions of the engine especially considering that a completely assembled engine has only a relatively small number of existing suspension points for connection to an air frame and that such suspension points will only, in the completely assembled condition of the engine, provide a fairly acceptable means of fixation to the hoisting tackle of the crane.

The aim underlying the present invention essentially resides in providing a support stand arrangement for gas turbine engines which permits complete assembly or disassembly of the engine and/or a single engine module while affording easy access all around the engine.

In accordance with one feature of the present invention, a ground anchored base column is provided on which is arranged a yoke suitable for locating and attaching the engine with the yoke being mounted for rotation together with the engine about an axis of rotation extending at right angles to a centerline of the engine.

According to other features of the present invention, the yoke envelopes the engine over about one-half of its circumference. Moreover, the yoke may envelope the engine so that the engine is held by the yoke in the manner of a roof. Additionally, the yoke may be arranged so as to envelope the engine in the manner of a semi-circular ring.

In accordance with a further feature of the present invention, the yoke is provided with a plurality of wall sections which extend in parallel to horizontally and vertically extending center planes of the engine, as well as wall sections arranged at predetermined angles with respect to at least one of the planes.

According to the present invention, the base column and yoke are of welded box constructions with the yoke being attached as a cantilever to an outer ring of a pivot bearing. Moreover, all supporting arms arranged at the yoke may also be of welded box constructions.

The yoke in accordance with the present invention is fitted with supporting arms which, on the one hand, are arranged in the vertical longitudinal center plane of the engine and, on the other hand, approximately in parallel with this plane with the supporting arms including engine locating and/or attaching means, preferably at the outer ends thereof.

For the purpose of horizontally fixing the engine, according to yet another feature of the present invention, two oppositely arranged supporting arms of the yoke are each provided with a stop face having locating means such as, for example, a bolt, to which a mount, either fixedly or removably attached to the engine, is fixed by means of a grip.

Moreover, according to the present invention, a clamping sleeve is provided for attaching the engine to a first supporting arm extending in a vertical center plane of the engine with the clamping sleeve being inserted into a given thrust bolt and being fixed by means of a stop hinge lug arranged at an extreme end of the first supporting arm.

In accordance with a still further feature of the present invention, the attaching means on the first supporting arm which extends along the vertical center plane of the engine form, together with the attaching means on the oppositely arranged supporting arms, a three-point suspension for the engine with the three suspension points lying in or approximately in a plane extending in parallel with the vertical position of the yoke when the support stand arrangement is in an original position.

Additionally, on a side opposite the first supporting arm extending in a vertical center plane of the engine, the yoke is provided with a second supporting arm exending in the vertical center plane of the engine with a clevis arranged at the outer end of the second supporting arm for permitting vertical adjustment, to which clevis a rear engine mount and/or a suspension member, fixedly or removably mounted to the engine casing, can be fixed by, for example, a ball pin separably arranged at the clevis.

Furthermore, according to the present invention, a front transport cradle and a rear transport cradle are provided for the engine, both of which are fully or partially separable from the engine after the engine has been attached to the yoke with the engine mounts being separable from the front transport cradle.

According to another feature of the present invention, to impart selective rotation to the yoke, an electric motor is provided for driving a reduction gearing, preferably a worm gear with an output pinion, which reduction gearing engages with circumferentially arranged teeth on an outer ring of the pivot bearing. A handwheel may be arranged on the motor shaft at an end opposite the reduction gearing for rotating the yoke.

Accordingly, it is an object of the present invention to provide a support arrangement for a gas turbine engine which avoids by simple means the shortcomings and disadvantages encountered in the prior art.

Another object of the present invention resides in providing a support arrangement for gas turbine engines which provides extremely fast and easy access for maintenance and assembly and/or removal of all engine component assemblies.

Yet another object of the present invention resides in providing a support arrangement which is especially suitable for fast and relatively easy maintenance of multiple-stream, multiple-spool gas turbine jet engines and their great number of turbine and casing components.

A further object of the present invention resides in providing a support arrangement for gas turbine jet engines which is easy to operate and which functions reliably under all operating conditions.

An additional object of the present invention resides in providing a support arrangement for gas turbine jet engines which supports an entire engine and which permits relative rotational displacement of the entire engine.

A still further object of the present invention resides in providing a support arrangement for gas turbine engines which permits the engine to be precisely adjusted, thereby facilitating access to the various components of the engine.

Figure 2:
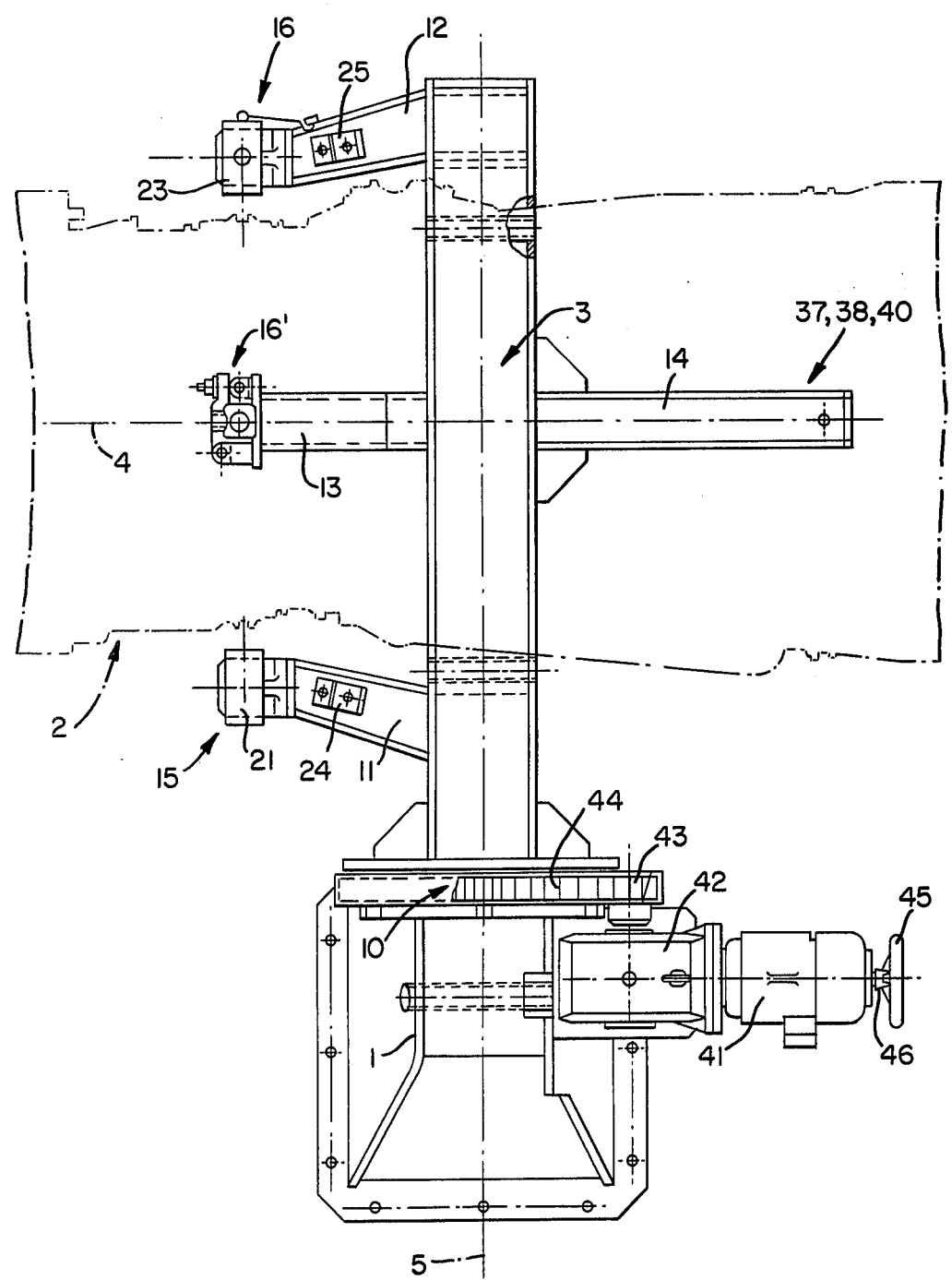
Figure 3:
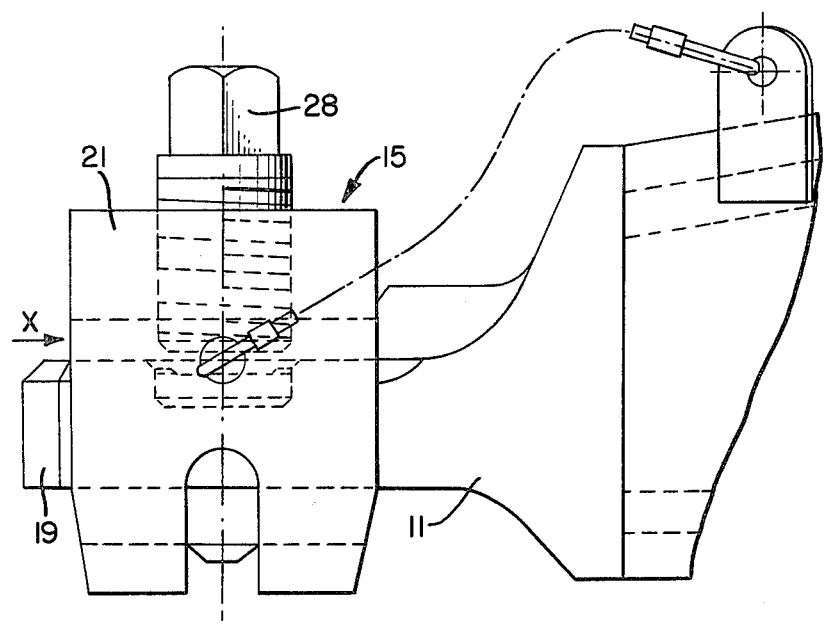
Figure 4:
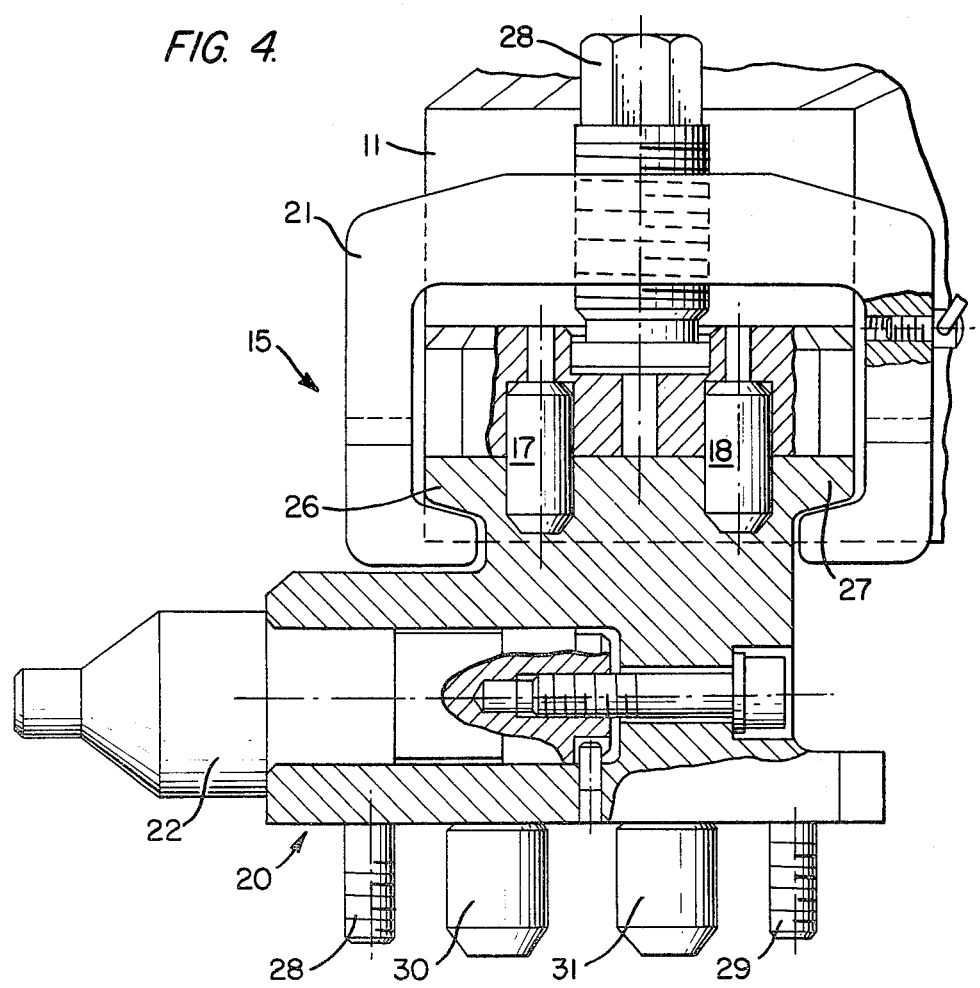
Figure 5:
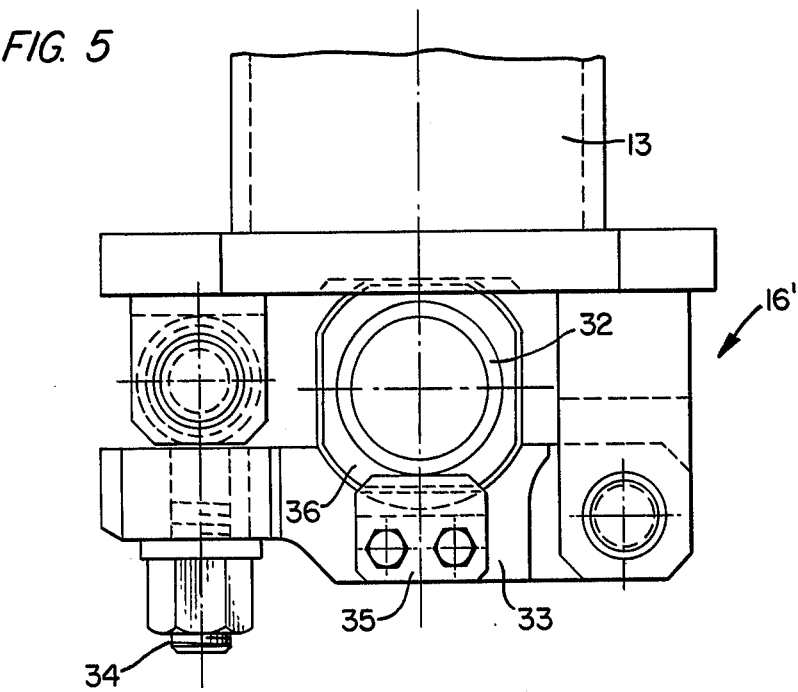
Figure 6:
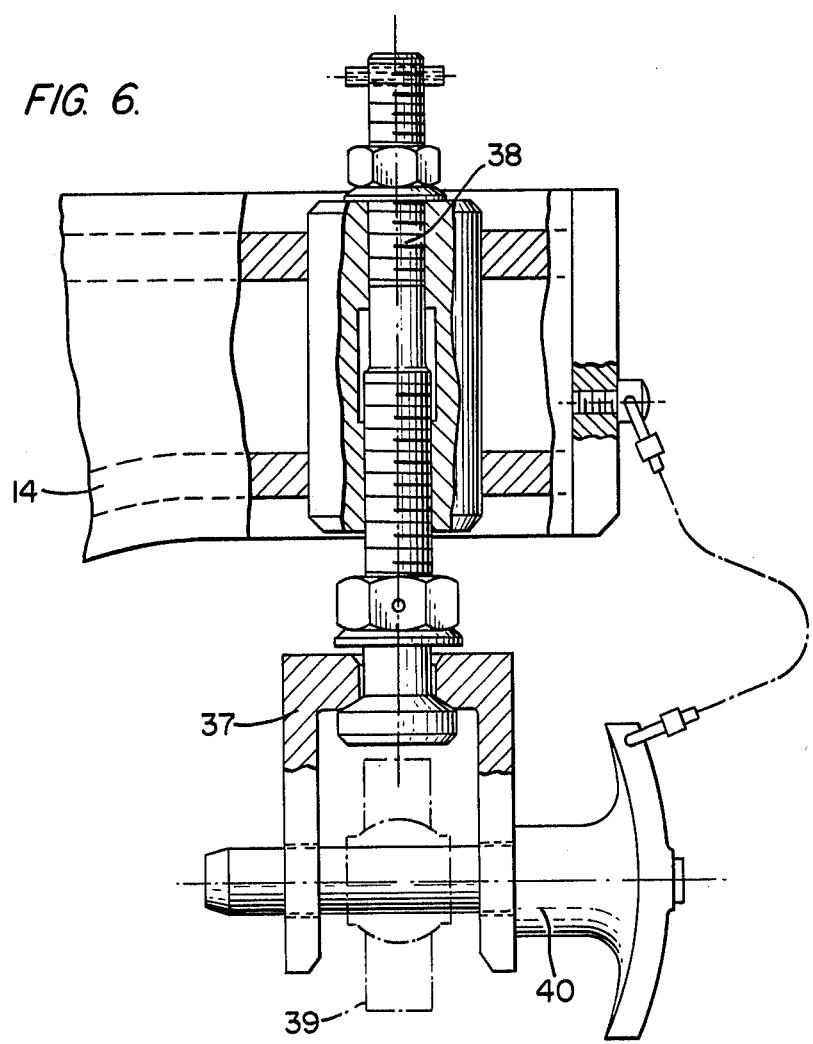

These and other objects, features and advantages of the present invention will become more apparent from the following description when taken in connection with the accompanying drawings which show, for the purposes of illustration only, one embodiment in accordance with the present invention, and wherein:

FIG. 1 is a perspective view of an engine support arrangement in accordance with the present invention having a schematically illustrated gas turbine jet engine supported thereby in a horizontal position, FIG. 2 is a top view of the engine support arrangement of FIG. 1, FIG. 3 is a side view of a grip arranged at an outer stop end of a lateral supporting arm of a yoke of the support arrangement in accordance with the present invention, FIG. 4 is a partial cross-sectional view of the outer stop end and grip taken in the direction of the arrow x in FIG. 3 cooperating with a connecting means for the engine, FIG. 5 is a top view of a further attaching means for the engine arranged with respect to a vertical position of the yoke at an outer end of a forward supporting arm, and FIG. 6 is a partial cross-sectional lateral end view of a rear supporting arm relative to an attaching means for the engine.

Referring now to the drawings wherein like reference numerals are used throughout the various views to designate like parts and, more particularly, to FIG. 1, a support stand arrangement for gas turbine engines generally designated by the reference numeral 2 and, more particularly, turbo-jet engines, includes a base column 1 anchored to a support surface or floor and a yoke generally designated by the reference numeral 3 with the yoke 3 serving to accommodate and secure the engine 2 for pivotal movement together with the engine about an axis of rotation 5 (FIG. 2) extending at right angles to a longitudinal centerline of the engine 2. The yoke 3 envelopes a portion of the engine 2 and holds the engine 2 over about one-half of the circumference thereof in essentially the manner of a roof. The yoke 3 may also be constructed so as to envelope the engine 2 in the manner of a semi-circular ring.

The yoke 3 includes wall sections 6, 7 which extend in parallel to the horizontal and vertical longitudinal center planes of the engine 2 and wall sections 8, 9 arranged at a consistent angle with respect to one of these planes. The base column 1 and the yoke 3 may be welded box constructions with the yoke 3 being arranged as a cantilever arm on an outer ring generally designated by the reference numeral 10 of a pivot bearing, as shown most clearly in FIG. 2.

As shown in FIGS. 1 and 2, the yoke 3 is provided with supporting arms 11, 12, 13, 14 with the supporting arms 13, 14 being arranged, with the engine mounted, in the vertical longitudinal center plane of the engine and the supporting arms 11, 12 being approximately in parallel to the vertical longitudinal center plane. The supporting arms 11, 12 are provided with engine locating and attaching means generally designated by the reference numerals 15, 16, respectively, preferably arranged at the outer ends of the arms.

As shown in FIGS. 3 and 4, for an exemplary locating and attaching means 15, the engine 2 is arrested in a horizontal position by means of a stop face 19 which is fitted with locating bolts 17, 18 and arranged on the lateral supporting arm 11 to fix the position of a fixedly mounted or releasably connected mount generally designated by the reference numeral 20 on the engine casing by means of a grip 21. A bolt 22 is inserted in the mount 20 for threaded engagement with the mount 20 at one end and for engagement in a lateral recess in the engine casing (not shown) at the other end.

The grip 21, as with the grip 23 of FIG. 2 associated with the locating and attaching means 16, is readily releasably connected, before the engine is installed, to retaining members 24 or 25 provided on the two opposite lateral supporting arms 11, 12. In this manner, as soon as the mount 20 (FIG. 4) has been located centrally by way of locating bolts 17, 18 for a snug seat on stop face 19, the grip 21 is separated from the retaining member 24 on the lateral supporting arm 11 and slipped from the front over the stop face 19 as well as over the laterally projecting T-portions 26, 27 of the mount 20 with final fixation of the engine mount 20 on the stop face 19 or lateral supporting arm 11 being achieved by tightening the clamping screw 28. To allow the mount 20 to engage in an engine locating frame (not shown), attaching screws or locating bolts 28, 29, 30, 31 are provided.

At the end of the supporting arm 13 which extends in the vertical center plane of the engine, attaching means generally designated by the reference numeral 16' are provided for attaching the engine 2 to the supporting arm 13. As shown in FIG. 5, the attaching means 16' includes a clamping sleeve which is adapted to be inserted in a given thrust pin. The clamping sleeve 32 can be arrested by means of a stop hinge lug 33 arranged at the extreme end of the supporting arm 13 by utilizing a rotatable eyebolt 34 such that when the stop hinge lug 33 has been screwed into place, a stop plate 35 on the lug 33 will arrest a laterally projecting collar 36 of the clamping sleeve 32.

As most clearly shown in FIG. 2, the attaching means 16' on the first supporting arm 13, which extends in the vertical center plane of the engine, provides, together with the attaching means 15, 16 on the oppositely arranged supporting arms 11, 12, a three-point suspension for the engine with the three suspension points lying in or approximately in a plane extending in parallel to the vertically arranged yoke with the support stand arrangement in the original position illustrated in FIG. 1.

A further supporting arm 14 is provided on the yoke 3 on a side opposite the first supporting arm 13 with the second supporting arm 14 extending in the vertical center plane of the engine 2. As shown in FIG. 6, a clevis 37 is arranged at the outer end of the support arm 14 for permitting an adjustment in parallel with the positional plane of the yoke 3 by means of a threaded pin 38. The rear engine mount or a suspension member 39, fixedly or releasably connected to the engine casing, can thus be arrested using a ball pin 40 which is separably arranged on the clevis 37.

As shown most clearly in FIGS. 1 and 2, an electric motor 41 is provided for driving a reduction gear 42 which is preferably constructed as a worm gear having an output pinion 43 which engages circumferentially arranged teeth 44 provided on the outer ring 10 of the pivot bearing arranged on the base column 1, whereby rotation is imparted to the yoke 3.

To obtain maximum precision in the adjustment of the yoke 3, the yoke 3 and the engine 2 attached thereto can be rotated by means of a handwheel 45 arranged at an end 46 of the shaft of the motor 41 on a side opposite the reduction gear 42. The handwheel 45 can also be utilized to operate the support stand arrangement in the event of a power failure.

By virtue of the support arrangement of the present invention, the entire engine 2 including the after-burner pipe 47, the exhaust nozzle 48 and the integrated thrust reverser system with the thrust reverser buckets 49 and thrust reverser actuating and mounting means 50, can be attached to the yoke 3 and can be rotated through 180° in the direction of the arrow F from the horizontal position shown in FIG. 1, and the rotating mechanism can be stopped in any intermediate position.

With the after-burner 47, exhaust nozzle 48 and thrust reverser system removed, the remaining basic engine 3 can be rotated through 360° in the direction of the arrow F or G and the rotating mechanism, the yoke 3 and the engine 2 can be stopped in any intermediate position.

To connect or disconnect the complete engine 2 to or from the yoke 3, for example, a jacking dolley (not shown) supporting the engine 2 and two transport cradles (not shown) may be employed. Thus, for example, to mount the engine 2 at the support stand arrangement, with the yoke 3 in the vertical position shown in FIG. 1, the jacking dolley would be rolled under the yoke 3 to a position where the attaching points of the engine 2 are aligned as accurately as possible below or at the same level with the attaching means 15, 16, 16' (FIG. 2) or 37, 38 (FIG. 6). Engine 2 would then be moved vertically upward by the jacking dolley to a point where the mounts, for example, mounts 20 (FIG. 4) come into contact with the stop faces 19 to the left and right, after which the engine 2 is finally fixed at the supporting arms 11, 12 by utilizing the grips 21, 23. The engine 2 is then fixed at the supporting arm 13 employing the attaching means 16' by inserting the clamping sleeve 32 and arresting the sleeve 32 by means of the stop hinge lug 33. Thereafter, the rear engine mount is attached to the supporting arm 14 at the clevis 37 by inserting the ball pin 40.

To remove the engine 2 attached in its entirety to the support stand arrangement, the order of installation noted above is reversed, that is, the jacking dolley is rolled into position, the transport cradles are vertically raised by the jacking dolley, the rear engine mount (FIG. 6) is disengaged, and thereafter the attaching means 16' (FIG. 5) are released. The two grips 21, 23 of the two attaching means 15, 16 are then loosened and the engine, together with the two transport cradles and including the mounts 20 (FIG. 4) are lowered and can be rested on the front transport cradles with the jacking means of the jacking dolley and then the jacking dolley is rolled away from the supporting stand arrangement.

In a same or similar order of operation as described above in connection with a jacking dolley, the engine 2 can be brought to the supporting stand arrangement or detached therefrom from above using a portal jib crane with the yoke 3 being allowed to remain vertical, but open at the top. Attachment of the engine 2 to the supporting stand arrangement would then take place in a position shifted by 90° from that shown in FIG. 1.

When the engine 2 is positioned and suspended on the yoke 3, as shown in FIG. 1, it will be possible to, for example, starting from the left-hand side of the figure, remove first the low-pressure compressor and then the intermediate-pressure compressor plus associated casings 51, 52, respectively, which may be of a three-spool bypass construction. The remaining engine would then still be suspended by the intermediate casing 53.

With the engine 2 and the yoke 3 still in the position shown in FIG. 1, it would then be possible to remove, starting from the right-hand side of the figure, the thrust reverser buckets 49 and the thrust reverser actuating and mounting means 50, one after the other.

With the engine 2 rotated from its position of FIG. 1 through 90° to a vertical position, it is then possible to remove, for example, working from above, the jet pipe 47, the after-burner flame tube (not shown), the afterburner proper (not shown), the turbine exhaust casing (not shown), the low-pressure turbine rotor (not shown) and so on until ultimately only the intermediate casing 53 (FIG. 1) remains which, if necessary, can still be separated from the attaching means 15, 16, 16' (FIG. 2).

For ease of assembly from above of, for example, the components at the turbine end, it is of a particular advantage that the entire support stand arrangement is conceived with regard to the center of gravity of the engine 2 such that, after removal of the after-burner pipe plus the thrust reverser system, the remaining engine can be held sufficiently secure at the yoke by way of the attaching means 15, 16, 16' (FIG. 2) and that, for various maintenance and/or assembly operations, not detailed herein, the engine 2 can be rotated to any intermediate position while securely suspended from only the three suspension points.

While we have shown and described only one embodiment in accordance with the present invention, it is understood that the same is not limited thereto, but is susceptible of numerous changes and modifications as known to one having ordinary skill in the art, and we therefor do not wish to be restricted to the details shown and described herein, but intend to cover all such changes and modifications as are encompassed by the scope of the appended claims.

We claim:

1. A support stand arrangement for a gas turbine engine, more particularly, a turbo-jet engine, the arrangement comprising:

a single support anchored base column, yoke means surrounding over about one-half of a circumference of the engine for supporting the engine at the base column, means for mounting said yoke means as a cantilever arm to said base column so as to be rotatable from a horizontal position to and from a vertical position about an axis of rotation extending at right angles to a center line of the engine, a first supporting arm means connected at a free end of said yoke means at a first lateral side of the engine and extending approximately parallel to a vertical longitudinal center plane of the engine, a second supporting arm means connected to said yoke means at a second lateral side of the engine and extending approximately parallel to a vertical longitudinal center plane of the engine, a third and fourth supporting arm means respectively disposed on a forward and rearward side of the yoke means, said third and fourth supporting arm means being arranged in the vertical longitudinal center plane of the engine, means are provided on the outer ends of each of said supporting arm means for at least one of locating and connecting the engine to said supporting arm means, said locating and connecting means provided on the first and second supporting arm means and on the third supporting arm means forming a three-point suspension system for the engine with suspension points of the suspension system lying at least approximately in a plane which extends parallel to respective positions of the yoke means as said yoke means is rotated about said axis of rotation.

2. The arrangement of claim 1, wherein the yoke means extends above the engine in the manner of a roof.

3. The arrangement of claim 1, wherein the yoke means includes first wall sections extending parallel to a horizontal center plane of the engine, second wall sections extending parallel to a vertical center plane of the engine, and further wall sections arranged at a predetermined angle with respect to one of the center planes of the engine.

4. The arrangement of claim 3, wherein the yoke means surrounds the engine in the manner of a semi-circular ring.

5. The arrangement of claim 3, wherein the yoke means and the base column are of a welded box construction, and wherein said mounting means includes a pivot bearing having an outer ring, said outer ring mounting said yoke means to said base column.

6. The arrangement of claim 5, wherein said means for at least one of locating and connecting the engine to said yoke means includes means for fixing the engine with respect to a horizontal plane.

7. The arrangement of claim 6, wherein said fixing means includes a stop face provided on each of said third and fourth supporting arms, and grip means for fixing mounts of the engine against locating bolts of the stop face.

8. The arrangement of claim 7, wherein the mounts of the engine are one of fixedly or removably connected to the engine.

9. The arrangement of claim 7, wherein said fourth supporting arm extending along the vertical longitudinal center plane of the engine has mounted thereon means for permitting an adjustment of the engine in a positional plane of the yoke means.

10. The arrangement of claim 3, wherein said locating and connecting means provided on said first and second supporting arm means include a stop face provided on each of said first and second supporting arm means, and locating bolt means provided on said stop face, said stop face and said locating bolt means being adapted to be releasably connected with a mount attachable to a housing of the engine.

11. The arrangement of claim 10, wherein the locating and connecting means provided on the third supporting arm means includes a clamping sleeve adapted to be inserted into a thrust pin, and a stop hinge lug means is disposed at an outer end of the third supporting arm means for locking the clamping sleeve in position.

12. The arrangement of claim 11, wherein the locating and connecting means provided on the fourth supporting arm means includes a vertically adjustable lever adapted to be connected to one of an engine mount and supporting element adapted to be connected with a housing of the engine by a ball pin means.

13. The arrangement of claim 12, wherein means are provided for selectively driving said yoke means so as to rotate said yoke means with the engine attached thereto including an electric drive motor operatively connected to a reduction gearing means having an output pinion including gear teeth engageable with circumferentially arranged gear teeth of an outer gear ring of said mounting means.

14. The arrangement of claim 13, wherein a handwheel means is provided on a drive shaft of the motor at an end thereof opposite said reduction gearing means for permitting rotation of the yoke means.

15. A support stand arrangement for a gas turbine engine, more particularly, a turbo-jet engine, the arrangement comprising:

a support anchored base column, yoke means surrounding over about one-half of a circumference of the engine, said yoke means includes first wall sections extending parallel to a horizontal center plane of the engine, second wall sections extending parallel to a vertical center plane of the engine, and further wall sections arranged at a predetermined angle with respect to one of the center planes of the engine, said yoke means and the base column being of a welded box construction, means for mounting said yoke means at said base column so as to be rotatable about an axis of rotation extending at right angles to a center line of the engine including a pivot bearing having an outer ring mounting said yoke means to said base column as a cantilever arm, a plurality of supporting arms provided at said yoke means, at least one of said supporting arms extending along a vertical longitudinal center plane of the engine, at least one further supporting arm provided on each side of said at least one supporting arm, said further supporting arms extending parallel to the vertical longitudinal center plane of the engine, means on each of said further supporting arms for at least one of locating and connecting the engine to said yoke means including means for fixing the engine with respect to a horizontal plane, said fixing means including a stop face provided on each of said further supporting arms, and grip means for fixing mounts of the engine against locating bolts of the stop face, and means provided on at least one of said supporting arms extending along the vertical longitudinal center plane of the engine for attaching the engine to said supporting arm, said attaching means includes a clamping sleeve means adapted to be inserted into a thrust bolt, and stop hinge lug means for fixing the position of said clamping sleeve means.

16. The arrangement of claim 15, wherein said stop hinge lug means is arranged at a free end of said at least one supporting arm extending along the vertical longitudinal center plane of the engine.

17. The arrangement of claim 16, wherein at least one additional supporting arm is provided at the yoke means, said additional supporting arm extending along the vertical center plane of the engine on a side of the yoke means opposite said first-mentioned supporting arm extending along the vertical center plane of the engine, and wherein a clevis means is provided at an outer end of said additional supporting arm for permitting a vertical adjustment of one of a rear engine mount or suspension member connected to a casing of the engine, and wherein a ball pin means is provided at the clevis means for fixing the vertical adjustments.

18. The arrangement of claim 17, wherein the rear engine mount or the suspension member is one of fixedly or removably connected to the engine casing.

19. The arrangement of claim 17, wherein a front transport cradle means and a rear transport cradle means are provided for the engine, and wherein both of said cradle means are one of fully or partially separable from the engine after the engine has been attached to the yoke means.

20. The arrangement of claim 18, wherein the mounts of the engine fixed by said grip means are separable from the front transport cradle.

21. The arrangement of claim 20, wherein means are provided for selectively driving said yoke means so as to rotate said yoke means and the engine attached thereto.

22. The arrangement of claim 21, wherein said driving means includes an electric drive motor operatively connected to a reduction gearing means having an output pinion, and wherein the output pinion includes gear teeth engageable with circumferentially arranged gear teeth provided on said outer ring.

23. The arrangement of claim 22, wherein said reduction gearing means further includes a worm gear operatively connected to said output pinion.

24. The arrangement of claim 22, wherein a handwheel means is provided on a drive shaft of the motor at an end thereof opposite said reduction gearing means for permitting rotation of the yoke means.

25. A support stand arrangement for a gas turbine engine, more particularly, a turbo-jet engine, the arrangement comprising:
a support anchored base column,
yoke means for supporting the engine,
means for mounting said yoke means at said base column so as to be rotatable about an axis of rotation extending at right angles to a center line of the engine,
a plurality of supporting arms provided at said yoke means, at least one of said supporting arms extending along a vertical longitudinal center plane of the engine, at least one further supporting arm is provided on each side of said at least one supporting arm, said further supporting arms extending parallel to the vertical longitudinal center plane of the engine,
means provided on each of said further supporting arms for at least one of locating and connecting the engine to said yoke means, and
a stop hinge lug means arranged at a free end of said at least one supporting arm extending along the vertical longitudinal center plane of the engine for fixing a position of the locating and connecting means provided on said supporting arm means.

26. The arrangement of claim 25, wherein at least one additional supporting arm is provided at the yoke means, said additional supporting arm extending along the vertical center plane of the engine on a side of the yoke means opposite said first-mentioned supporting arm extending along the vertical center plane of the engine, and wherein a clevis means is provided at an outer end of said additional supporting arm for permitting a vertical adjustment of one of a rear engine mount or suspension member connected to a casing of the engine, and wherein a ball pin means is provided at the clevis means for fixing the vertical adjustments.

27. The arrangement of claim 26, wherein means are provided for selectively driving said yoke means so as to rotate said yoke means and the engine attached thereto.

* * * * *